United States Patent
Sheen et al.

(10) Patent No.: US 6,316,587 B1
(45) Date of Patent: Nov. 13, 2001

(54) POLYAMIDE COMPOSITION INCLUDING METAL SALT

(75) Inventors: Yuung-Ching Sheen, Hsinchu Hsien; Jen-Lien Lin, Hsinchu; Jiang-Jen Lin, Taichung; Meng-Yao Yang, Changhua Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/429,639

(22) Filed: Oct. 29, 1999

Related U.S. Application Data

(63) Continuation-in-part of application No. 09/317,987, filed on May 25, 1999, now abandoned, and a continuation-in-part of application No. 08/878,606, filed on Jun. 19, 1977, now Pat. No. 5,986,041.

(51) Int. Cl.$^7$ .............................. C08G 69/26; C08G 69/44
(52) U.S. Cl. .......................... 528/310; 528/170; 528/272; 528/288; 528/292; 528/322; 528/308; 528/339; 528/332; 528/335; 528/336

(58) Field of Search ...................................... 528/170, 310, 528/272, 288, 292, 322, 308, 339, 332, 335, 336

(56) References Cited

U.S. PATENT DOCUMENTS

| | | | | |
|---|---|---|---|---|
| 4,663,428 | * | 5/1987 | Okitu et al. ........................ | 528/324 |
| 5,082,924 | * | 1/1992 | Speranza et al. .................... | 528/339 |
| 5,086,162 | * | 2/1992 | Speranza et al. .................... | 528/339 |
| 5,122,303 | * | 6/1992 | Tieke ................................. | 252/518 |
| 5,744,573 | * | 4/1998 | Brubaker ............................ | 528/322 |
| 5,882,800 | * | 3/1999 | Brennan et al. ..................... | 428/480 |
| 5,986,041 | * | 11/1999 | Cheng et al. ........................ | 528/310 |

* cited by examiner

Primary Examiner—P. Hampton-Hightower
(74) Attorney, Agent, or Firm—Sughrue, Mion, Zinn, Macpeak & Seas, PLLC

(57) ABSTRACT

The present invention provides a polyamide composition comprising: a polyamide containing an alkylene oxide group; and a metal salt. The polyamide composition of the present invention has long lasting antistatic properties and a lower surface resistivity than the polyamide alone.

25 Claims, No Drawings

POLYAMIDE COMPOSITION INCLUDING METAL SALT

This application is a continuation-in-part of application Ser. No. 08/878,606 filed Jun. 19, 1997, now issued as U.S. Pat. No. 5,986,041, and application Ser. No. 09/317,987 filed May 25, 1999, now abandoned.

BACKGROUND OF THE INVENTION

1. Field of the Invention

The present invention relates to a polyamide composition which includes an alkylene oxide group-containing polyetheramide or polyetheresteramide and a metal salt, and more particularly to a polyamide composition with long lasting antistatic properties and a lower surface resistivity than the polyamide alone.

2. Description of the Prior Art

To impart a polymer with antistatic properties is often achieved by adding an antistatic agent. Antistatic agents can be categorized into two groups: those with low molecular weights, for example, conventional surfactant-type antistatic agents; and those with high molecular weights. After being added into a polymer, the antistatic agent with a low molecular weight will easily migrate to the polymer surface and thus deteriorate the properties of the polymer. In some cases, the antistatic property will be lost by washing or wiping. On the other hand, owing to their polymeric structure, antistatic agents with high molecular weights are compatible with other polymers, and thus, the second group of antistatic agent has long lasting antistatic properties.

Conventional antistatic agents with high molecular weights suitable for polyesters or polyamides are normally categorized into two groups. One group is formed by using a sulfonate or a polyethylene oxide (PEO) with a high molecular weight coated on the surface of the polymer or added inside the polymer. For example, in Japanese Patent No. 5,262,460, a PET (polyethylene terephthalate) is blended with a PEO of 5000 g/mole to 16000 g/mole to obtain an antistatic resin. In U.S. Pat. No. 5,010,193, a PET is blended with an ethylene oxide copolymer of 2000 g/mole to 50000 g/mole to improve the antistatic property and compatibility. In U.S. Pat. Nos. 5,194,327 and 5,182,169, a sulfonate with a high molecular weight is coated on the surface of a polyester to correct the disadvantages in the antistatic agent with a low molecular weight, such as opacity and surface cake. Thus, the antistatic property is enhanced.

In the other group, the polyester is modified with a PEO or a sulfonate to improve the hydrophility and to obtain the antistatic polyester. For example, in U.S. Pat. Nos. 5,130,073, 5,064,703, 4,713,194, and 4,506,070, a polyester is condensed with a PEO to, obtain a hydrophilic polyester. However, due to the incomplete reaction between EO and diacid, an antistatic agent with a high molecular weight is not easy to form.

In U.S. Pat. Nos. 4,943,510, 5,051,475, and 4,468,433, a polyester is reacted with a dicarboxy phenyl sulfonate to obtain a hydrophilic polyester. However, the physical and antistatic properties of the polymers are poor.

In U.S. Pat. No. 4,872,910, a conductive composition includes at least one metal crosslinking latex binder and a metal salt/polyethylene oxide complex. However, the compatibility of the polyethylene oxide with the latex binder is poor, and the conductive composition has poor antistatic properties.

In U.S. Pat. No. 5,882,800, an antistatic composition includes a polyester/polyalkylene oxide copolymer and a lithium salt. In U.S. Pat. No. 5,122,303, an ion-conducting composition includes a polyester/polyether copolymer and a lithium salt. However, there is still a need to decrease the surface resistivity of an antistatic composition.

SUMMARY OF THE INVENTION

The object of the present invention is to solve the above-mentioned problems and to provide a polyamide composition with long lasting antistatic properties and a lower surface resistivity.

To achieve the above-mentioned object, the polyamide composition of the present invention comprises:

a polyamide containing an alkylene oxide group; and a metal salt.

DETAILED DESCRIPTION OF THE INVENTION

The polyamide composition of the present invention include: a polyamide containing an alkylene oxide group; and a metal salt. The polyamide can be a polyetheramide (hereinafter referred to A1) or a polyetheresteramide (hereinafter referred to A2). The polyamide used in the present invention includes an alkylene oxide group, preferably an ethylene oxide group, more preferably a polyethylene oxide group (PEO group).

When the polyamide is a polyetheramide (A1), the polyetheramide (A1) can have a repeating unit represented by the following formula

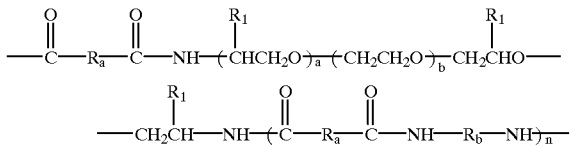

wherein $R_1$ is hydrogen, methyl, or a hydrocarbon group having from 2 to 20 carbon atoms;

the value of a+b is between 0 and 45;

$R_a$ is phenylene or a hydrocarbon group having from 1 to 20 carbon atoms; and $R_b$ is

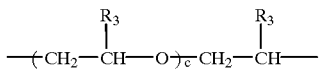

or a hydrocarbon group having from 2 to 50 carbon atoms, wherein c is between 1 and 45, and $R_3$ is hydrogen or a hydrocarbon group having from 1 to 10 carbon atoms; and n is equal to or greater than 0.

In the above-mentioned polyetheramide (A1), when $R_a$ is phenylene, preferably $R_1$ is methyl and $R_b$ has the formula

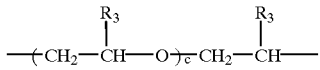

wherein c is between 1 and 45, and $R_3$ is hydrogen.

In the above-mentioned polyetheramide (A1), when $R_a$ is butylene, preferably $R_1$ is methyl and $R_b$ has the formula

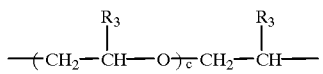

wherein c is between 1 and 45, and $R_3$ is hydrogen.

In the above-mentioned polyetheramide (A1), when $R_a$ is octamethylene, preferably $R_1$ is methyl and $R_b$ has the formula

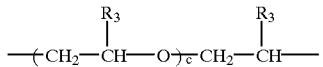

wherein c is between 1 and 45, and $R_3$ is hydrogen.

The polyetheramide (A1) of the present invention can be obtained by reacting a diacid or its derivative with a diamine under nitrogen at a temperature of 180° C. to 250° C., preferably 200° C. to 230° C., for about 2 to 3 hours.

When the polyamide is a polyetheramide (A1), the polyamide composition of the present invention can be obtained by mixing the polyetheramide (A1) with the metal salt, or alternatively can be obtained by reacting the diacid or its derivative with the diamine in the presence of the metal salt. That is to say, the metal salt can be added after or before the polyetheramide (A1) is formed.

The diacid or its derivative suitable for use for preparing the polyetheramide (A1) in the present invention can have the formula

wherein $R_a$ is phenylene or a hydrocarbon group having from 1 to 20 carbon atoms; and A is a carboxyl or an ester group. Representative examples include terephthalic acid, dimethyl terephthalate, isophthalic acid, adipic acid, sebacic acid, dodecane dicarboxylic acid, azelaic acid and naphthalic acid.

The diamine suitable for use for preparing the polyetheramide (A1) in the present invention should contain an alkylene oxide group. That is, the suitable diamine should contain at least one alkylene oxide group-containing diamine. For example, the suitable diamine can be a compound of formula (I), a mixture of formulae (I) and (II), a mixture of formulae (I) and (III), or a mixture of formulae (I), (II), and (III), represented by the following formulae:

(I)

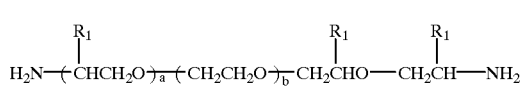

(II)

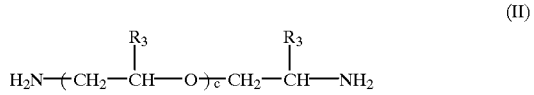

(III)

wherein $R_1$ is hydrogen, methyl, or a hydrocarbon group having from 2 to 20 carbon atoms; the value of a+b is between 0 to 45; c is between 1 and 45; $R_3$ is hydrogen or a hydrocarbon group having from 1 to 10 carbon atoms; and. $R_2$ is a hydrocarbon group having from 2 to 50 carbon atoms. Formulae (I) and (II) are alkylene oxide group-containing diamines.

The alkylene oxide group-containing diamine can be a commercially available one. Representative examples of formula (I) are
ED2003 having the formula

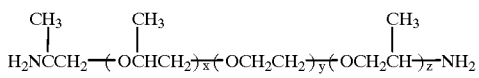

y = 40.5    x + z = 2.5

ED2001 having the formula

b = 40.5    a + c = 2.5 and D230 having the formula

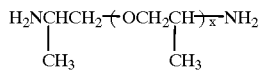

x = 2-3 and one representative example of formula (II) is EDR148 having the formula

all of which can be purchased from Huntsman Company.

When the polyamide used in the present invention is a polyetheresteramide (A2), the polyetheresteramide (A2) can have a repeating unit represented by the formula

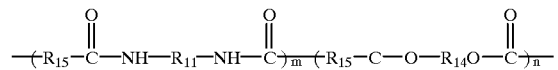

wherein
$R_{11}$ is a chain with an alkylene oxide group having the structure $-(R_0-O)_p-$, in which $R_0$ is a hydrocarbon group with 2 or 3 carbon atoms and p is about 10 to 45;
$R_{14}$ is a hydrocarbon group with 2 to 12 carbon atoms;
$R_{15}$ is a hydrocarbon group with 4 to 12 carbon atoms;
m and n are about 1 or larger; and
the polyetheresteramide has a molecular weight of about 3000 g/mole to 45,000 g/mole.

In the above-mentioned polyetheresteramide, preferably $R_{11}$ has a molecular weight of about 550 g/mole to 2020 g/mole, $R_{15}$ is an aromatic hydrocarbon group, and m and n are about 1 to 10.

The polyetheresteramide (A2) of the present invention can be obtained by reacting an alkylene oxide group-containing diamine with a diacid or its derivative and a diol under an inert gas at a temperature of 160° C. to 250° C., preferably 180° C. to 230° C. The mixing molar ratio of the diacid to the diol is preferably about 1.0:1.05 to 1.0:10.0, more preferably 1.0:1.05 to 1.0:6.0. In addition, the reaction pressure is reduced to 1 Torr or below to perform the esterification reaction. When 95% of the reactants are esterified, the temperature is raised to about 250° C. to 300° C., preferably to a temperature of 250° C. to 280° C. to perform polycondensation reaction. A polyetheresteramide with a molecular weight of 3000 g/mole to 45000 g/mole is obtained.

When the polyamide is a polyetheresteramide (A2), the polyamide composition of the present invention can be obtained by mixing the polyetheresteramide (A2) with the metal salt, or alternatively can be obtained by reacting the alkylene oxide group-containing diamine with the diacid or its derivative and the diol in the presence of the metal salt. That is to say, the metal salt can be added after or before the polyetheresteramide (A2) is formed.

The alkylene oxide group-containing diamine is preferably present in a weight percentage of about 3% to 90%, more preferably about 3% to 50%, based on the total weight of the reactants, i.e., the diamine, diacid and diol. When the weight percentage of the alkylene oxide group-containing diamine is over 3%, the polyetheresteramide (A2) obtained will have obvious antistatic properties.

The alkylene oxide group-containing diamine suitable for preparing the polyetheresteramide (A2) in the present invention can have the structure

wherein $R_{11}$ is a chain with an alkylene oxide group having the structure —$(R_0$—$O)_p$—, in which $R_0$ is a hydrocarbon group with 2 or 3 carbon atoms and p is about 10 to 45. Preferably, $R_{11}$ has a molecular weight of about 550 g/mole to 2020 g/mole.

For example, the alkylene oxide group-containing diamine suitable for preparing the polyetheresteramide (A2) in the present invention can be any one mentioned above that is suitable for preparing the polyetheramide (A1) in the present invention, that is, a compound represented by formula (I), (II), or a mixture thereof. Again, the alkylene oxide group-containing diamine for preparing the polyetheresteramide (A2) can be a commercially available one, such as ED2003, ED2001, D230, and EDR148, purchased from Huntsman Company.

The diacid or the derivative of the diacid suitable for preparing the polyetheresteramide (A2) in the present invention can be any one mentioned above for preparing the polyetheramide (A1).

The diol suitable for preparing the polyetheresteramide (A2) in the present invention can be in any form, preferably a diol with 2 to 6 carbon atoms. Representative examples include ethylene glycol, propylene glycol, 1,4-butanediol, 1,6-hexanediol, 1,4-cyclohexanediol, neopentyl diol, and polyethylene glycol.

The catalyst used for the esterification and polymerization is a metal complex, in which the metal can be zinc, manganese, titanium, magnesium, calcium, tin, and germanium.

The metal salt suitable for use in the present invention is preferably a salt of a monovalent to trivalent metal ion. Examples of suitable salts include monovalent alkali metal (Group IA) salts, such as lithium, sodium, or potassium salts; divalent alkaline earth metal (Group IIA) salts, such as barium, magnesium, or calcium salts; and trivalent salts, for example iron(III) salts, with various counter-ions, for example $ClO_4^-$, $BF_4^-$, $CF_3SO_3^-$, $PF_6^-$, $Cl^-$, $Br^-$, $I^-$, $SCN^-$, $NO_3^-$ or 7,7,8,8-tetracyanoquinodimethane (TCNQ—). In addition, the metal salt can be a salt of Group IB such as copper or a salt of Group VIIIB such as nickel or palladium.

Representative preferred metal salts include LiCl, KCl, $CaCl_2 \cdot 2H_2O$, $PdCl_2$, $CuCl_2 \cdot 2H_2O$, $NiCl_2 \cdot 6H_2O$, $FeCl_3$, NaSCN, NaI, $LiO_3SCF_3$, LiTCNQ, and $LiClO_4$, most preferably LiCl.

The weight ratio of the metal salt and the polyamide is preferably from 0.01:100 to 30:100.

A mixture of different alkylene oxide group-containing polyamides and a mixture of different metal salts can also be employed.

The weight average molecular weight of the alkylene oxide group-containing polyamide used in the present invention can vary over a wide range, but is preferably within the range from 1000 to 45,000 g/mole, more preferably 3000 to 35,000 g/mole.

The present invention has the following advantages:

(1) The polyamide composition of the present invention has a better reactivity than the conventional PEO modified polyester.

(2) The polyamide composition of the present invention can be used alone or be blended with other resins to form various kinds of antistatic products, such as antistatic films, antistatic bags, IC cover tapes, antistatic clothes, and dust free clothes. Also, the polyamide composition can be applied in semiconductors, electronic communication, and optoelectronic facilities.

(3) The metal salt can complex with the alkylene oxide group, preferably the polyethylene oxide group on the polyamide, and can also complex with the amino group on the polyamide. By means of such complexation, the polyamide composition becomes more stable, and the surface resistivity can be decreased to $10^4$ Ω/□, which is lower than that of the polyamide alone.

The following examples are intended to illustrate the process and the advantages of the present invention more fully without limiting its scope, since numerous modifications and variations will be apparent to those skilled in the art.

Synthesis of Polyetheramide

EXAMPLE 1

200 g (1.03 mole) of dimethylene terephthalate (DMT), 99 g (0.67 mole) of EDR148 (an alkylene oxide. group-containing diamine from Huntsman, Mw=148, amine equivalent weight (AEW)=37), and 720 g (0.36 mole) of ED2003 (an alkylene oxide group-containing diamine from Huntsman, Mw=2000, AEW=500) were charged in a reactor. The equivalent ratio of the total amino group of the two polyamines to the ester group of the DMT was 1:1. The amount of the EDR148 and ED2003 was 65 mole % and 35 mole % respectively. The reaction was conducted at about 200 to 230° C. under nitrogen for about 3 hours. The obtained polyetheramide resin has a surface resistivity of about $5 \times 10^7$ Ω/□.

EXAMPLE 2

100 g (0.52 mole) of DMT, 38 g of EDR148, and 520 g of ED2003 were charged in a reactor. The equivalent ratio of the total amino group of the two polyamines to the ester group of the DMT was 1:1. The amount of the EDR148 and ED2003 was 50 mole % and 50 mole % respectively. The reaction was conducted at about 200 to 230° C. under nitrogen for about 2.5 hours. The obtained polyetheramide resin has a surface resistivity of about $1.3 \times 10^8$ Ω/□.

EXAMPLE 3

73 g (0.5 mole) of adipic acid, 48.8 g (0.33 mole) of EDR148, and 340 g (0.17 mole) of ED2003 were charged in a reactor. The equivalent ratio of the total amino group of the two polyamines to the carboxyl group of adipic acid was 1:1.

The amount of the EDR148 and ED2003 was 66 mole % and 34 mole % respectively. The reaction was conducted at about 200 to 230° C. under nitrogen for about 2.5 hours. The obtained polyetheramide resin has a surface resistivity of about $1.6 \times 10^6$ Ω/□.

EXAMPLE 4

73 g (0.5 mole) of adipic acid, 17.7 g (0.12 mole) of EDR148, and 760 g (0.38 mole) of ED2003 were charged in a reactor. The equivalent ratio of the total amino group of the two polyamines to the carboxyl group of adipic acid was 1:1. The amount of the EDR148 and ED2003 was 24 mole % and 76 mole % respectively. The reaction was conducted at about 200 to 230° C. under nitrogen for about 2.5 hours. The obtained polyetheramide resin has a surface resistivity of about $4 \times 10^9$ Ω/□.

EXAMPLE 5

101 g (0.5 mole) of sebacic acid, 48.8 g (0.33 mole) of EDR148, and 340 g (0.17 mole) of ED2003 were charged in a reactor. The equivalent ratio of the total amino group of the two polyamines to the carboxyl group of sebacic acid was 1:1. The amount of the EDR148 and ED2003 was 66 mole % and 34 mole % respectively. The reaction was conducted at about 200 to 230° C. under nitrogen for about 3 hours. The obtained polyetheramide resin has a surface resistivity of about $6 \times 10^8$ Ω/□.

EXAMPLE 6

101 g (0.5 mole) of sebacic acid, 17.7 g (0.12 mole) of EDR148, and 760 g (0.38 mole) of ED2003 were charged in a reactor. The equivalent ratio of the total amino group of the two polyamines to the carboxyl group of sebacic acid was 1:1. The amount of the EDR148 and ED2003 was 24 mole % and 76 mole % respectively. The reaction was conducted at about 200 to 230° C. under nitrogen for about 2.5 hours. The obtained polyetheramide resin has a surface resistivity of about $4 \times 10^9$ Ω/□.

Table 1 shows the compositions of the reactants for examples 1 to 6 and the surface resistivity (antistatic properties) of the polyetheramide resins obtained. From the table, it can be seen that the polyetheramide resins obtained have a surface resistivity between $10^6$ to $10^9$ Ω/□, indicating that they have excellent antistatic properties.

antioxidant, 0.5 g of antimony oxide, and 0.5 g of zinc acetate were charged into a reaction chamber, in which ED2001 was about 12% based on the total weight of the reactants. After four hours of reaction at about 180° C. to 230° C., the temperature was raised to 280° C. The pressure was gradually reduced to 1 Torr or below over an hour. After one hour of reaction under this condition, a polyetheresteramide was obtained which has a surface resistivity of about $2 \times 10^{10}$ Ω/□. The results are shown in Table 2.

EXAMPLE 8

200 g of terephthalic acid (TPA), 310 g of ethylene glycol (EG), 60 g of ED2001, 0.1 g of an antioxidant, 0.1 g of antimony oxide, and 0.1 g of calcium acetate were charged into a reaction chamber, in which ED2001 was about 20% based on the total weight of the reactants. After five hours of reaction at about 180° C. to 230° C., the temperature was raised to 280° C. The pressure was gradually reduced to 1 Torr or below over an hour. After two hours of reaction under this condition, a polyetheresteramide was obtained which has a surface resistivity of about $3 \times 10^8$ Ω/□. The results are shown in Table 2.

EXAMPLE 9

200 g of adipic acid (AA), 95 g of ethylene glycol (EG), 60 g of ED2001, 0.1 g of an antioxidant, and 0.1 g of zinc acetate were charged into a reaction chamber, in which ED2001 was about 20% based on the total weight of the reactants. After four hours of reaction at about 180° C. to 230° C., a polyetheresteramide was obtained which has a surface resistivity of about $10^9$ Ω/□. The results are shown in Table 2.

EXAMPLE 10

200 g of sebacic acid (SA), 71 g of ethylene glycol (EG), 65 g of ED2001, 0.1 g of an antioxidant, and 0.1 g of zinc acetate were charged into a reaction chamber, in which ED2001 was about 20% based on the total weight of the reactants. After six hours of reaction at about 180° C. to 230° C., a polyetheresteramide was obtained which has a surface resistivity of about $2 \times 10^9$ Ω/□. The results are shown in Table 2.

EXAMPLE 11

200 g of terephthalic acid (TPA), 85 g of ethylene glycol (EG), 60 g of ED2001, 0.1 g of an antioxidant, and 0.1 g of

TABLE 1

| Mole % of the Reactants | | Exp. 1 | Exp. 2 | Exp. 3 | Exp. 4 | Exp. 5 | Exp. 6 |
| --- | --- | --- | --- | --- | --- | --- | --- |
| diacid | DMT | 50.0 | 50.0 | — | — | — | — |
| | adipic acid | — | — | 50.0 | 50.0 | — | — |
| | sebacic acid | — | — | — | — | 50.0 | 50.0 |
| diamine | ED2003 | 17.5 | 25.0 | 17.5 | 38.0 | 17.5 | 38.0 |
| | EDR148 | 32.5 | 25.0 | 32.5 | 12.0 | 32.5 | 12.0 |
| Surface Resistivity (Ω/□) | | $5.0 \times 10^7$ | $1.3 \times 10^8$ | $1.6 \times 10^6$ | $4 \times 10^9$ | $6 \times 10^8$ | $4 \times 10^9$ |

Synthesis of Polyetheresteramide

EXAMPLE 7

200 g of terephthalic acid (TPA), 158 g of ethylene glycol (EG), 32 g of ED2001 (an alkylene oxide group-containing diamine from Huntsman, Mw=2000), 0.5 g of an zinc acetate were charged into a reaction chamber, in which ED2001 was about 20% based on the total weight of the reactants. After eight hours of reaction at about 210° C. to 230° C., a polyetheresteramide was obtained which has a surface resistivity of about $1 \times 10^9$ Ω/□. The results are shown in Table 2.

EXAMPLE 12

200 g of terephthalic acid (TPA), 389 g of ethylene glycol (EG), 200 g of ED2001, 0.5 g of an antioxidant, 0.5 g of antimony oxide, and 0.5 g of zinc acetate were charged into a reaction chamber, in which ED2001 was about 45% based on the total weight of the reactants. After 6.5 hours of reaction at about 180° C. to 230° C., a polyetheresteramide was obtained which has a surface resistivity of about $1\times10^8$ $\Omega/\square$. The results are shown in Table 2.

EXAMPLE 13

200 g of terephthalic acid (TPA), 158 g of ethylene glycol (EG), 15 g of ED2001, 0.1 g of an antioxidant, 0.1 g of antimony oxide, and 0.1 g of calcium acetate were charged into a reaction chamber, in which ED2001 was about 6% based on the total weight of the reactants. After five hours of reaction at about 180° C. to 230° C., the temperature was raised to 280° C. The pressure was gradually reduced to 1 Torr or below over an hour. After 1.5 hours of reaction under this condition, a polyetheresteramide was obtained which has a surface resistivity of about $4\times10^{11}$ $\Omega/\square$. The results are shown in Table 2.

EXAMPLE 14

200 g of terephthalic acid (TPA), 158 g of ethylene glycol (EG), 7.5 g of ED2001, 0.1 g of an antioxidant, 0.1 g of antimony oxide, and 0.1 g of zinc acetate were charged into a reaction chamber, in which ED2001 was about 3% based on the total weight of the reactants. After five hours of reaction at about 180° C. to 230° C., the temperature was raised to 280° C. The pressure was gradually reduced to 1 Torr or below over an hour. After 1.5 hours of reaction under this condition, a polyetheresteramide was obtained which has a surface resistivity of about $1\times10^{12}$ $\Omega/\square$. The results are shown in Table 2.

EXAMPLE 15

200 g of terephthalic acid (TPA), 158 g of ethylene glycol (EG), 25 g of ED2001, 0.1 g of an antioxidant, 0.1 g of antimony oxide, and 0.1 g of zinc acetate were charged into a reaction chamber, in which ED2001 was about 9% based on the total weight of the reactants. After five hours of reaction at about 180° C. to 230° C., the temperature was raised to 280° C. The pressure was gradually reduced to 1 Torr or below over an hour. After two hours of reaction under this condition, a polyetheresteramide was obtained which has a surface resistivity of about $2\times10^{11}$ $\Omega/\square$. The results are shown in Table 2.

Referring to Table 2, it is known that when the weight percentage of the alkylene oxide group-containing diamine increases, the surface resistivity is decreased, that is, the antistatic property is better. When the weight percentage of the alkylene oxide group-containing diamine is over 3%, the antistatic property becomes obvious.

TABLE 2

| Example | Diol | Diacid | Molar Ratio of Diol/Diacid | Weight percentage of alkylene oxide group-containing diamine | Surface Resistivity ($\Omega/\square$) | Molecular Weight (g/mole) |
| --- | --- | --- | --- | --- | --- | --- |
| 7 | EG | TPA | 2 | 12 | $2 \times 10^{10}$ | 38000 |
| 8 | EG | TPA | 4 | 20 | $3 \times 10^{8}$ | 41000 |
| 9 | EG | AA | 1.1 | 20 | $1 \times 10^{9}$ | 3500 |
| 10 | EG | SA | 1.1 | 20 | $2 \times 10^{9}$ | 3800 |
| 11 | EG | TPA | 1.1 | 20 | $1 \times 10^{9}$ | 4000 |
| 12 | EG | TPA | 5 | 45 | $1 \times 10^{8}$ | 4500 |
| 13 | EG | TPA | 2 | 6 | $4 \times 10^{11}$ | 37000 |
| 14 | EG | TPA | 2 | 3 | $1 \times 10^{12}$ | 42000 |
| 15 | EG | TPA | 2 | 9 | $2 \times 10^{11}$ | 32000 |

Preparation of Polyamide Composition Including Metal Salt

EXAMPLE 16

141 g of sebacic acid, 250 g of ED2003, and 132 g of D-230 (an alkylene oxide group-containing diamine from Huntsman) were charged in a reactor. The reaction was conducted at about 200 to 230° C. under nitrogen for about 3 hours. The obtained polyamide (a polyetheramide) has a surface resistivity of about $1\times10^{7.2}$ $\Omega/\square$.

The polyamide obtained was dissolved in NMP, and then mixed with 19.2 wt % of LiCl based on the weight of the polyamide. After evaporating the solvent, the polyamide composition was obtained with a surface resistivity of about $1\times10^{4.2}$ $\Omega/\square$.

EXAMPLE 17

The same procedures as described in Example 16 were employed, except that 0.26 wt % of LiCl was used. The obtained polyamide composition has a surface resistivity of about $1\times10^{6.4}$ $\Omega/\square$.

EXAMPLE 18

The same procedures as described in Example 16 were employed, except that LiCl was replaced by 29.5 wt % of KCl. The obtained polyamide composition has a surface resistivity of about $1\times10^{6.6}$ $\Omega/\square$.

EXAMPLE 19

The same procedures as described in Example 16 were employed, except that LiCl was replaced by 0.61 wt % of KCl. The obtained polyamide composition has a surface resistivity of about $1\times10^{5.7}$ $\Omega/\square$.

EXAMPLE 20

The same procedures as described in Example 16 were employed, except that LiCl was replaced by 8.42 wt % of $CaCl_2.2H_2O$. The obtained polyamide composition has a surface resistivity of about $1\times10^{6.6}$ $\Omega/\square$.

EXAMPLE 21

The same procedures as described in Example 16 were employed, except that LiCl was replaced by 0.6 wt % of $CaCl_2 \cdot 2H_2O$. The obtained polyamide composition has a surface resistivity of about $1 \times 10^{6.6}$ Ω/□.

EXAMPLE 22

The same procedures as described in Example 16 were employed, except that LiCl was replaced by 9.96 wt % of $PdCl_2$. The obtained polyamide composition has a surface resistivity of about $1 \times 10^{5.6}$ Ω/□.

EXAMPLE 23

The same procedures as described in Example 16 were employed, except that LiCl was replaced by 0.33 wt % of $PdCl_2$. The obtained polyamide composition has a surface resistivity of about $1 \times 10^{6.8}$ Ω/□.

EXAMPLE 24

The same procedures as described in Example 16 were employed, except that LiCl was replaced by 9.6 wt % of $CuCl_2 \cdot 2H_2O$. The obtained polyamide composition has a surface resistivity of about $1 \times 10^{5.5}$ Ω/□.

EXAMPLE 25

The same procedures as described in Example 16 were employed, except that LiCl was replaced by 0.6 wt % of $CuCl_2 \cdot 2H_2O$. The obtained polyamide composition has a surface resistivity of about $1 \times 10^{6.6}$ Ω/□.

EXAMPLE 26

The same procedures as described in Example 16 were employed, except that LiCl was replaced by 5.74 wt % of $NiCl_2 \cdot 6H_2O$. The obtained polyamide composition has a surface resistivity of about $1 \times 10^{5.4}$ Ω/□.

EXAMPLE 27

The same procedures as described in Example 16 were employed, except that LiCl was replaced by 0.76 wt % of $NiCl_2 \cdot 6H_2O$. The obtained polyamide composition has a surface resistivity of about $1 \times 10^{6.6}$ Ω/□.

EXAMPLE 28

The polyamide obtained from Example 13 was dissolved in NMP, and then mixed with 0.24 wt % of LiCl based on the weight of the polyetheresteramide. After evaporating the solvent, the polyamide composition was obtained with a surface resistivity of about $8 \times 10^5$ Ω/□.

EXAMPLE 29

The same procedures as described in Example 28 were employed, except that the polyamide used was obtained from Example 14 and the metal salt used was 0.113 wt % of LiCl based on the weight of the polyetheresteramide. After evaporating the solvent, the polyamide composition was obtained with a surface resistivity of about $1 \times 10^6$ Ω/□.

EXAMPLE 30

The same procedures as described in Example 28 were employed, except that the polyamide used was obtained from Example 15 and the metal salt used was 0.446 wt % of LiCl based on the weight of the polyetheresteramide. After evaporating the solvent, the polyamide composition was obtained with a surface resistivity of about $8 \times 10^5$ Ω/□.

EXAMPLE 31

200 g of adipic acid (AA), 95 g of ethylene glycol (EG), 200 g of ED2001, 0.1 g of an antioxidant, 0.1 g of zinc acetate, and lithium chloride (LiCl) were charged into a reaction chamber, in which ED2001 was about 50% and LiCl was about 5% based on the weight of the monomers (AA, EG, and ED2001) of the polyetheresteramide to be formed. After four hours of reaction at about 180° C. to 230° C., a polyetheresteramide was obtained which has a surface resistivity of about $10^5$ Ω/□.

EXAMPLE 32

200 g of adipic acid (AA), 95 g of ethylene glycol (EG), 200 g of ED2001, 0.1 g of an antioxidant, 0.1 g of zinc acetate, and lithium chloride (LiCl) were charged into a reaction chamber, in which ED2001 was about 50% and LiCl was about 1% based on the weight of the monomers (AA, EG, and ED2001) of the polyetheresteramide to be formed. After four hours of reaction at about 180° C. to 230° C., a polyetheresteramide was obtained which has a surface resistivity of about $10^{6.5}$ Ω/□.

From examples 16–32, it can be seen that the surface resistivity of the polyamide can be decreased by the addition of a metal salt, no matter the metal salt is added after or before the polyamide is formed.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A polyamide composition comprising: a polyetheramide containing an alkylene oxide group; and a metal salt, wherein the polyetheramide has a repeating unit represented by the following formula:

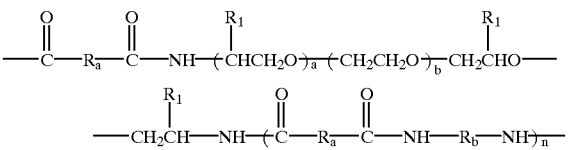

wherein
$R_1$ is a hydrogen, methyl, or a hydrocarbon group having from 2 to 20 carbon atoms;
the value of a+b is between 0 and 45;
$R_a$ is phenylene or a hydrocarbon group having from 1 to 20 carbon atoms;
$R_b$ is

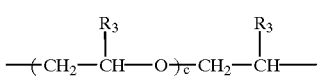

or a hydrocarbon group having from 2 to 50 carbon atoms, wherein c is between 1 and 45, and
$R_3$ is hydrogen or a hydrocarbon group having from 1 to 10 carbon atoms;
and n is equal to or greater than 0.

2. The polyamide composition as claimed in claim 1, wherein the polyetheramide is obtained by reacting a diacid or its derivative with a diamine, wherein the diamine contains an alkylene oxide group.

3. The polyamide composition as claimed in claim 2, wherein the polyamide composition is obtained by mixing the polyetheramide with the metal salt.

4. The polyamide composition as claimed in claim 2, wherein the polyamide composition is obtained by reacting the diacid or its derivative with the diamine in the presence of the metal salt, wherein the diamine contains an alkylene oxide group.

5. The polyamide composition as claimed in claim 2, wherein the diacid or its derivative has the formula

wherein $R_a$ is phenylene or a hydrocarbon group having from 1 to 20 carbon atoms; and A is a carboxyl or ester group.

6. The polyamide composition as claimed in claim 2, wherein the diamine includes a compound of formula (I)

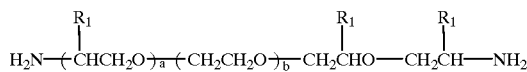

(I)

wherein $R_1$ is hydrogen, methyl, or a hydrocarbon group having from 2 to 20 carbon atoms; and the value of a+b is between 0 to 45.

7. The polyamide composition as claimed in claim 6, wherein the diamine further includes a compound of formula (II)

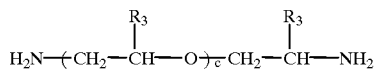

(II)

wherein c is between 1 and 45, and $R_3$ is hydrogen or a hydrocarbon group having from 1 to 10 carbon atoms.

8. The polyamide composition as claimed in claim 6, wherein the diamine further includes a compound of formula (III)

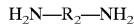

(III)

wherein $R_2$ is a hydrocarbon group having from 2 to 50 carbon atoms.

9. The polyamide composition as claimed in claim 6, wherein the diamine further includes compounds of formulae (II) and (III)

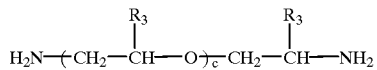

(II)

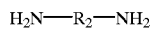

(III)

wherein
c is between 1 and 45;
$R_3$ is hydrogen or a hydrocarbon group having from 1 to 10 carbon atoms; and
$R_2$ is a hydrocarbon group having from 2 to 50 carbon atoms.

10. The polyamide composition as claimed in claim 1, wherein $R_a$ is selected from the group consisting of phenylene, butylene, and octamethylene.

11. The polyamide composition as claimed in claim 10, wherein $R_1$ is methyl.

12. The polyamide composition as claimed in claim 10, wherein $R_b$ has the formula

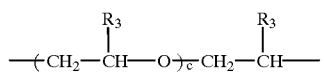

wherein c is between 1 and 45, and $R_3$ is hydrogen.

13. A polyamide composition comprising: a polyetheresteramide containing an alkylene oxide group, and a metal salt, wherein the polyetheresteramide has a repeating unit represented by the formula

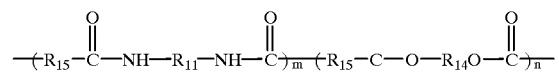

wherein
$R_{11}$ is a chain with an alkylene oxide group having the structure —$(R_o$—$O)_p$—, in which $R_o$ is a hydrocarbon group with 2 or 3 carbon atoms and p is about 10 to 45;
$R_{14}$ is a hydrocarbon group with 2 to 12 carbon atoms;
$R_{15}$ is a hydrocarbon group with 4 to 12 carbon atoms;
m and n are about 1 or larger; and
the polyetheresteramide has a molecular weight of about 3000 g/mole to 45,000 g/mole.

14. The polyamide composition as claimed in claim 13, wherein the polyetheresteramide is obtained by a method comprising
mixing an alkylene oxide group-containing diamine with a diacid or its derivative and a diol;
performing an esterification reaction; and
performing a condensation reaction to form the polyetheresteramide polymer.

15. The polyamide composition as claimed in claim 14, wherein the polyamide composition is obtained by mixing the polyetheresteramide with the metal salt.

16. The polyamide composition as claimed in claim 14, wherein the polyamide composition is obtained by a method comprising
mixing the alkylene oxide group-containing diamine with the diacid or its derivative and the diol in the presence of the metal salt;
performing an esterification reaction; and
performing a condensation reaction to form the polyetheresteramide polymer.

17. The polyamide composition as claimed in claim 14, wherein the alkylene oxide group-containing diamine has the structure

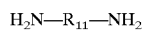

wherein $R_{11}$ is a chain with an alkylene oxide group.

18. The polyamide composition as claimed in claim 17, wherein the alkylene oxide group has the structure —$(R_o$—$O)_p$—, in which $R_o$ is a hydrocarbon group with 2 or 3 carbon atoms and p is about 10 to 45.

19. The polyamide composition as claimed in claim 14, wherein the mixing molar ratio of diacid to diol is about 1.0:1.05 to 1.0:10.0.

20. The polyamide composition as claimed in claim 14, wherein the alkylene oxide group-containing diamine is present in a weight percentage of about 3% to 90%.

21. The polyamide composition of claim 1, wherein the metal salt is a salt of a monovalent to trivalent metal ion.

22. The polyamide composition as claimed in claim 21, wherein the metal salt is a salt of Group IA or IIA.

23. The polyamide composition as claimed in claim 21, wherein the metal salt is a salt of Group IB or VIIIB.

24. The polyamide composition of claim 1, wherein the weight ratio of the metal salt to polyamide is from 0.1:100 to 30:100.

25. The polyamide composition of claim 1, wherein the polyamide has a molecular weight of 1000 to 45,000 g/mole.

* * * * *